United States Patent
Reed et al.

(10) Patent No.: US 11,433,733 B2
(45) Date of Patent: Sep. 6, 2022

(54) HEATING, VENTILATION, AND AIR CONDITIONING SYSTEM AND A METHOD FOR DETECTING CABIN AIR FILTER USAGE

(71) Applicant: Ford Global Technologies, LLC, Dearborn, MI (US)

(72) Inventors: Dennis Craig Reed, Dexter, MI (US); Imad Hassan Makki, Dearborn Heights, MI (US); Hadi Abbas, Westland, MI (US); Alan Gutowski, Wixom, MI (US); Clay Wesley Maranville, Ypsilanti, MI (US); Volker Scheer, Roetgen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 16/797,006

(22) Filed: Feb. 21, 2020

(65) Prior Publication Data

US 2021/0260957 A1    Aug. 26, 2021

(51) Int. Cl.
*B60H 1/00* (2006.01)
*B60H 3/06* (2006.01)

(52) U.S. Cl.
CPC ........ *B60H 1/00585* (2013.01); *B60H 1/008* (2013.01); *B60H 1/0073* (2019.05); *B60H 1/0075* (2013.01); *B60H 1/00785* (2013.01); *B60H 1/00828* (2013.01); *B60H 1/00978* (2013.01); *B60H 3/06* (2013.01); *B60H 2003/0683* (2013.01)

(58) Field of Classification Search
CPC .............. B60H 1/00585; B60H 1/0073; B60H 1/0075; B60H 1/00785; B60H 1/008; B60H 1/00828; B60H 1/00978; B60H 3/06; B60H 3/0616; B60H 3/0608; B60H 2003/0683; F24F 11/39
See application file for complete search history.

(56) References Cited

U.S. PATENT DOCUMENTS

| | | | |
|---|---|---|---|
| 6,239,694 B1 * | 5/2001 | Honda ................... | B01D 46/46 340/457 |
| 6,842,117 B2 | 1/2005 | Keown | |
| 10,828,986 B2 * | 11/2020 | Faraji .................... | B01D 46/46 |
| 2014/0034401 A1 | 2/2014 | Cardoso et al. | |
| 2015/0094865 A1 * | 4/2015 | Choi ....................... | F24F 11/30 700/278 |

(Continued)

FOREIGN PATENT DOCUMENTS

| | | |
|---|---|---|
| DE | 4037685 A1 | 6/1992 |
| DE | 10036502 C1 | 4/2002 |

(Continued)

*Primary Examiner* — Jenna M Hopkins
(74) *Attorney, Agent, or Firm* — Vichit Chea; Price Heneveld LLP

(57) ABSTRACT

A vehicle heating, ventilation, and air conditioning (HVAC) system including a cabin air filter, a sensor for providing a sensor reading, and a controller for determining a feedback signal from the sensor reading, wherein the controller determines a cabin air filter expected blockage level from the feedback signal. The feedback signal relates to a usage modifier of the cabin air filter, wherein the controller at east partially adjusts the estimated usage the cabin air filter from the usage modifier.

5 Claims, 8 Drawing Sheets

(56) References Cited

U.S. PATENT DOCUMENTS

| | | | |
|---|---|---|---|
| 2017/0274737 A1* | 9/2017 | Delaruelle | B60H 1/00764 |
| 2017/0356835 A1* | 12/2017 | Hoke | B60H 1/00742 |
| 2020/0139850 A1 | 5/2020 | Salter et al. | |
| 2021/0260957 A1* | 8/2021 | Reed | B60H 1/00828 |

FOREIGN PATENT DOCUMENTS

| | | | | |
|---|---|---|---|---|
| DE | 102009018704 A1 | | 10/2010 | |
| FR | 3081781 A1 | * | 12/2019 | B01D 46/0086 |
| WO | WO-2020064187 A1 | * | 4/2020 | |

* cited by examiner

HEATING, VENTILATION, AND AIR CONDITIONING SYSTEM AND A METHOD FOR DETECTING CABIN AIR FILTER USAGE

FIELD OF THE DISCLOSURE

The present disclosure generally relates to a heating, ventilation, and air conditioning (HVAC) system for a vehicle, and more particularly to estimating usage of a cabin air filter of the HVAC system.

BACKGROUND OF THE DISCLOSURE

HVAC systems for vehicles generally include a cabin air filter configured to remove particulates from HVAC intake air entering a passenger cabin of the vehicle. Over the life of the cabin air filter, the particulates may block the HVAC intake air from flowing through the cabin air filter thereby decreasing the efficiency and/or the functionality of the HVAC system.

SUMMARY OF THE DISCLOSURE

According to one aspect of the present disclosure, a vehicle heating, ventilation, and air conditioning (HVAC) system includes a cabin air filter, a sensor for providing a sensor reading, and a controller for determining a feedback signal from the sensor reading. The feedback signal relates to a usage modifier of the cabin air filter.

Embodiments of the first aspect of the present disclosure can include any one or a combination of the following features:
  the sensor reading relates to cabin air temperature, ambient air temperature, discharge air temperature, sun load intensity, blower speed, air distribution mode, air quality, humidity, carbon dioxide levels, and combinations thereof;
  the feedback signal is a function of at least a cabin air temperature setting, a cabin air temperature, an ambient air temperature, and an air distribution mode;
  the feedback signal relates to at least one of a discharge air temperature and a blower level;
  the feedback signal is combined with a feed forward signal to determine at least one of a target discharge air temperature and a target blower level;
  the controller is configured to provide an alert corresponding to a usage level of the cabin air filter to a user of the HVAC system;
  the controller is configured to combine the usage modifier with a distance-based usage estimation to determine an overall usage estimation of the cabin air filter; and
  the controller is configured to modify an estimated usage rate of the cabin air filter based on the usage modifier.

According to a second aspect of the present disclosure, a method for determining a usage level of a cabin air filter includes providing a heating, ventilation, and air conditioning (HVAC) system having a cabin air filter, a sensor for providing a sensor reading, and a controller operably coupled to the sensor. The method further includes receiving a reading from the sensor and using the reading from the sensor to determine a feedback signal with the controller, wherein the feedback signal relates to a usage modifier of the cabin air filter.

Embodiments of the second aspect of the present disclosure can include any one or a combination of the following features:
  the feedback signal is a function of at least a cabin air temperature setting, a cabin air temperature, an ambient air temperature, and an air distribution mode;
  the feedback signal relates to at least one of a discharge air temperature and a blower level;
  combining the feedback signal with a feed forward signal to determine at least one of a target discharge air temperature and a target blower level;
  combining the usage modifier with a distance-based usage estimation to determine an overall usage estimation of the cabin air filter; and
  modifying an estimated usage rate of the cabin air filter based on the usage modifier.

According to a third aspect of the present disclosure, a vehicle heating, ventilation, and air conditioning (HVAC) system includes a cabin air filter, an ambient air temperature sensor, a cabin air temperature sensor, and a controller operably coupled to the ambient air temperature sensor, and the cabin air temperature sensor. The controller is configured to provide a feedback signal based on the ambient air temperature, the cabin air temperature, a cabin air temperature setting, and an air distribution mode of the HVAC system. The feedback signal relates to a usage modifier of the cabin air filter.

Embodiments of the third aspect of the present disclosure can include any one or a combination of the following features:
  the feedback signal is combined with a feed forward signal to determine at least one of a target discharge air temperature and a target blower level;
  the controller is configured to combine the usage modifier with a distance-based usage estimation to determine an overall usage estimation of the cabin air filter;
  the controller is configured to modify an estimated usage rate of the cabin air filter based on the usage modifier;
  the controller is configured to provide an alert corresponding to a usage level of the cabin air filter to a user of the HVAC system; and
  the controller is configured to modify an estimated usage rate of the cabin air filter based on the usage modifier.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
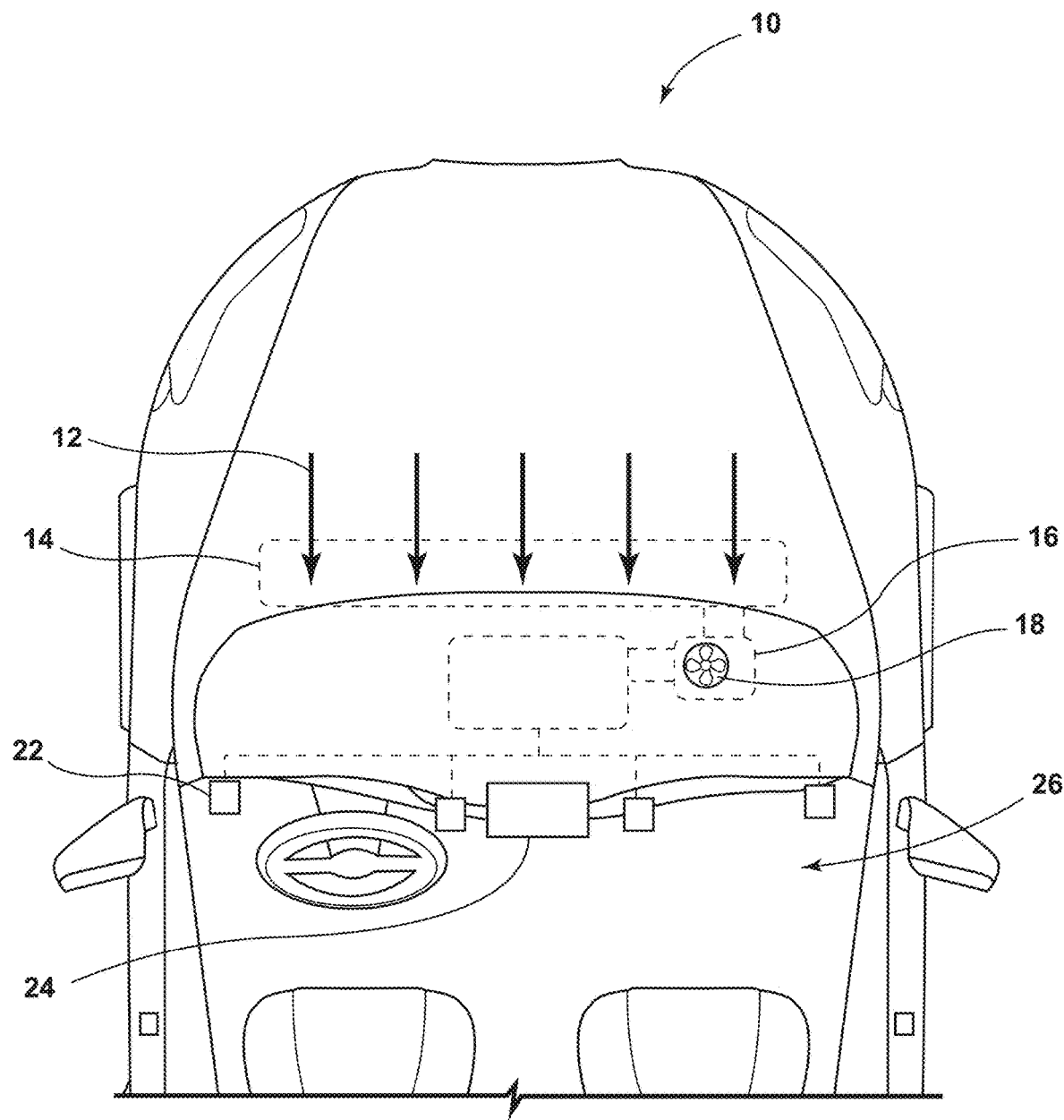
FIG. 1 is a top partially schematic view of a vehicle including an HVAC system.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring now to FIG. 1, a vehicle 10 is provided including an HVAC system for providing comfort to one or more passengers in a cabin 26 of the vehicle 10. Typically, HVAC intake air 12 enters the cabin 26 of the vehicle 10 via a cowl 14 located near a windshield of the vehicle 10. The HVAC intake air 12 is directed through a cabin air filter 16 to remove particulates (e.g., dust, soot, pollen, and pollutants) from the HVAC intake air 12. In some embodiments, the cabin air filter 16 includes materials (e.g., activated charcoal) configured to remove odors. A blower 18 is provided proximal the cabin air filter 16 to help move air through the HVAC system. From the blower 18, the HVAC intake air 12 moves to an HVAC case where the air is heated and/or cooled and continues to the cabin 26 through at least one duct 22.

In various embodiments, the HVAC system includes a plurality of ducts 22. Typically, the HVAC system includes one or more panel ducts, one or more defrost ducts, and one or more floor ducts. In some embodiments, the HVAC system may also include one or more rear HVAC ducts (e.g., for directing air to a second seating row and/or a third seating row). In various embodiments, the HVAC system is configured to operate in a plurality of air distribution modes including, but not limited to, panel mode, defrost mode, floor mode, driver-only mode, and combinations thereof.

The HVAC system further comprises an HVAC controller 24. Typically the HVAC controller 24 is operably coupled to one or more user controls. In various embodiments, the HVAC controller 24 is configured to receive one or more signals relating to various HVAC settings including, but not limited to, cabin air temperature setting (e.g., driver side set temperature and/or passenger side set temperature), driver/passenger synchronization settings (i.e., sync mode), blower level, air distribution mode, recirculation mode, air conditioning (AC) mode (i.e., HVAC compressor on/off state), rear defroster setting, seat heater settings, automatic temperature control settings, rear HVAC settings (e.g., rear set temperature and rear blower level), and combinations thereof. In various embodiments, the HVAC controller 24 is configured to receive at least one input from one or more HVAC sensors. Contemplated HVAC sensors include, but are not limited to, a sun load sensor, a cabin temperature sensor, a humidity sensor, and air quality sensor, a carbon dioxide sensor, a blend door position sensor, a recirculation door position sensor, an evaporator temperature sensor, a refrigerant pressure sensor, a refrigerant temperature sensor, a discharge air temperature sensor, an ambient air temperature sensor, and combinations thereof.

Figure 2:
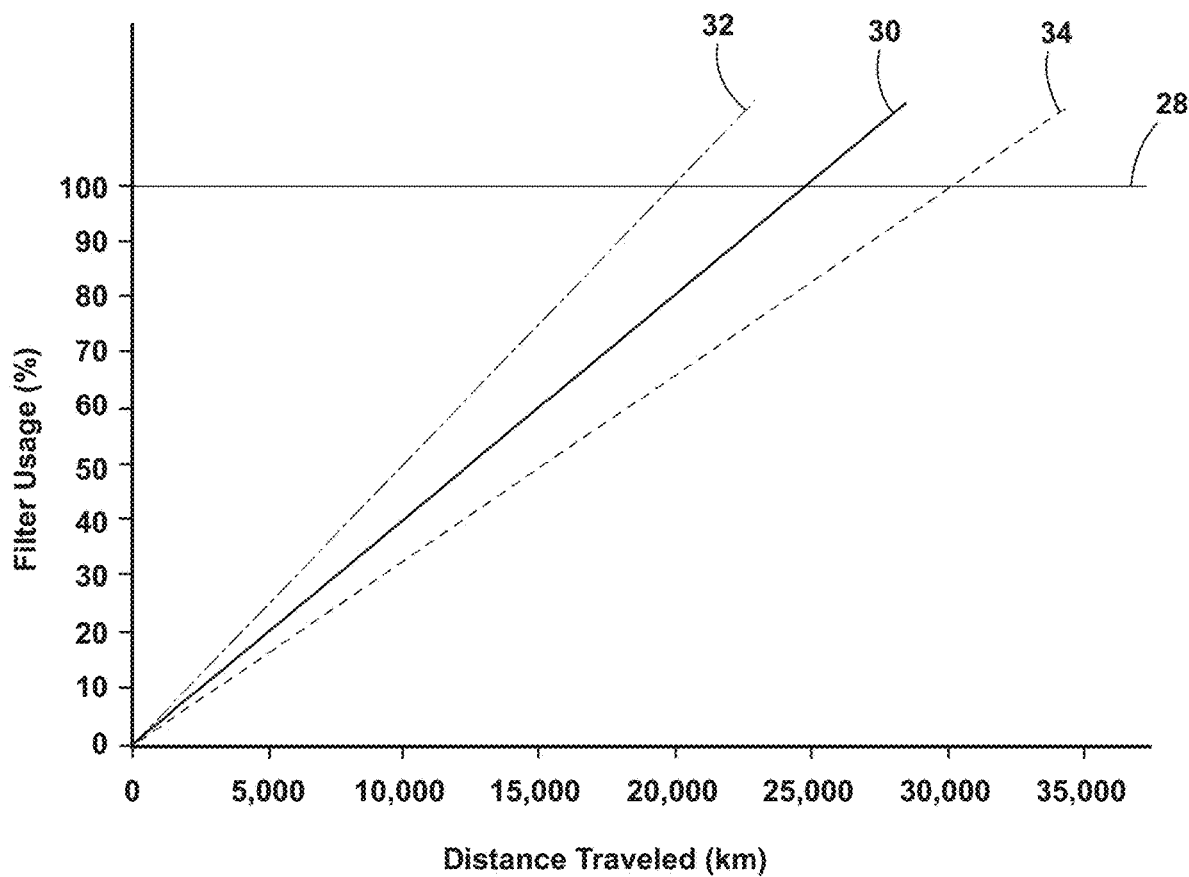
FIG. 2 is a graph illustrating cabin air filter usage estimation as a function of distance travelled.

Referring now to FIG. 2, the cabin air filter 16 may become blocked with particulates which may restrict airflow through the cabin air filter 16. The restriction of the airflow through the cabin air filter 16 typically results in decreased performance of the HVAC system. Accordingly, the cabin air filter 16 may need to be replaced when the cabin air filter 16 reached a determined filter usage level. In the shown embodiment, a filter replacement level 28 corresponds to a 100 percent filter usage level. In various embodiments, the filter usage level may correspond to an actual percent blockage of the cabin air filter 16. For example, a 100 percent filter usage level may correspond to a 10 percent, a 15 percent, or a 20 percent actual blockage of the cabin air filter 16. Typically, it is desirable to replace the cabin air filter 16 when the actual blockage of the cabin air filter 16 is from about 10 percent to about 20 percent. However, the desired replacement level of the cabin air filter 16 may vary according to a plurality of factors including, but not limited to, filter size, blower size/capabilities, and HVAC system design. In various embodiments, the filter replacement level 28 may correspond to any percentage of actual blockage of the cabin air filter 16 without departing from the scope of the present disclosure.

Referring still to FIG. 2, a distance-based usage estimation 30 is utilized for estimating the filter usage level of the cabin air filter 16. The distance-based usage estimation 30 corresponds to a distance traveled by the vehicle 10 after replacement of the cabin air filter 16. In the shown embodiment, the distance-based usage estimation 30 estimates that the filter usage level will reach the filter replacement level 28 at about 25,000 kilometers (km). In various embodiments, the distance-based usage estimation 30 may correspond to any distance traveled. For example, the distance-based usage estimation 30 may correspond to the filter usage level reaching the filter replacement level 28 at a distance of about 15,000 km, 20,000 km, 25,000 km, 30,000 km, or any other distance according to a variety of factors affecting the filter usage level.

In various examples, the actual filter usage level may vary from the distance-based usage estimation 30 due to additional factors including, but not limited to, pollution levels, distances traveled on dirt roads, water intrusion into the HVAC system, and HVAC system usage. Generally, the actual filter usage level is between a minimum usage variant 32 and a maximum usage variant 34. According to various embodiments, the HVAC controller 24 may be configured to provide an adjusted usage estimation 46A-46D (FIGS. 6A and 6B) based on the distance-based usage estimation 30 and a feedback signal generated by the HVAC controller 24 based on readings received from the one or more HVAC sensors.

Figure 3A:
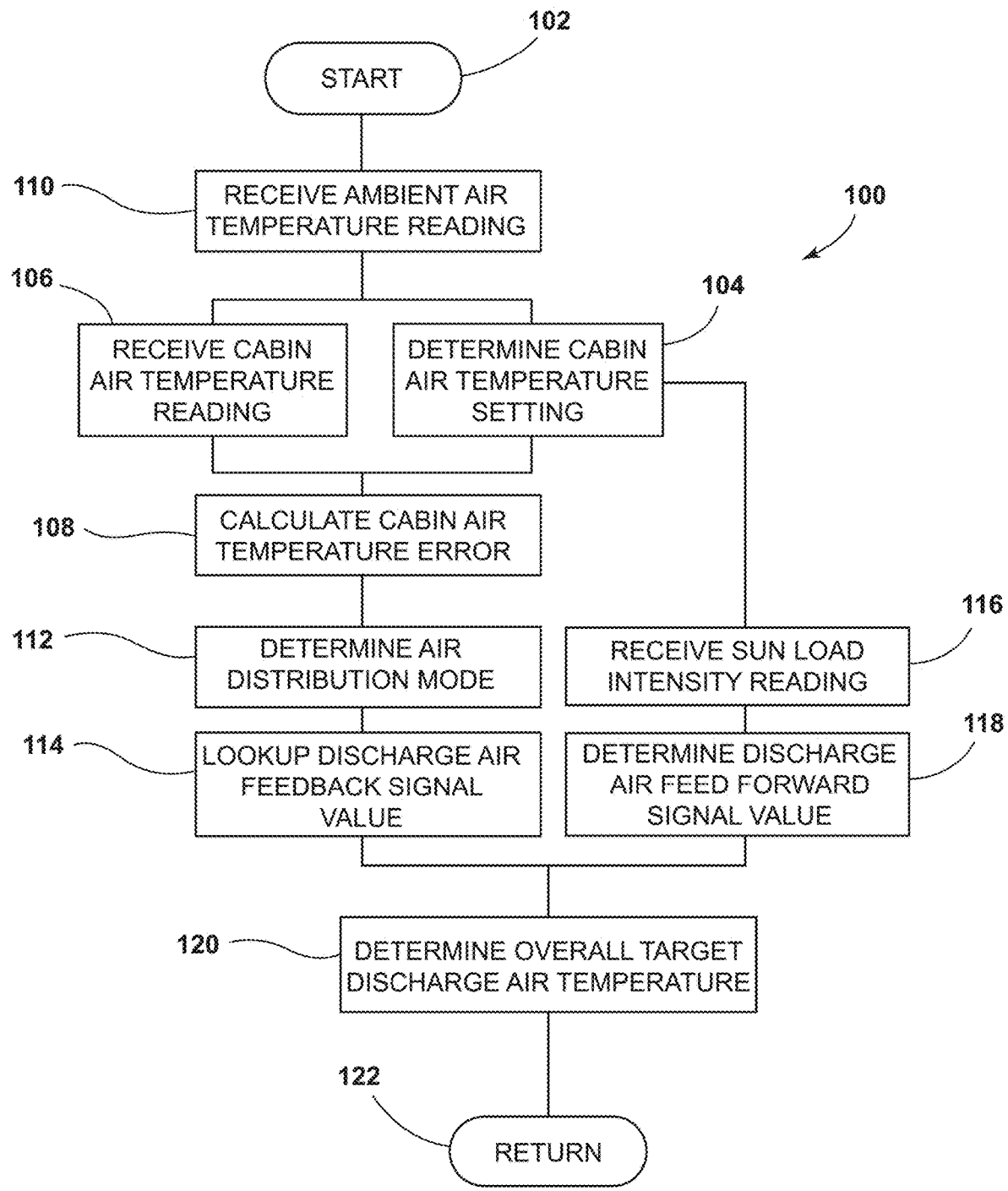
FIG. 3A is a flow diagram illustrating a method for determining a discharge air feedback signal.
Figure 3B:
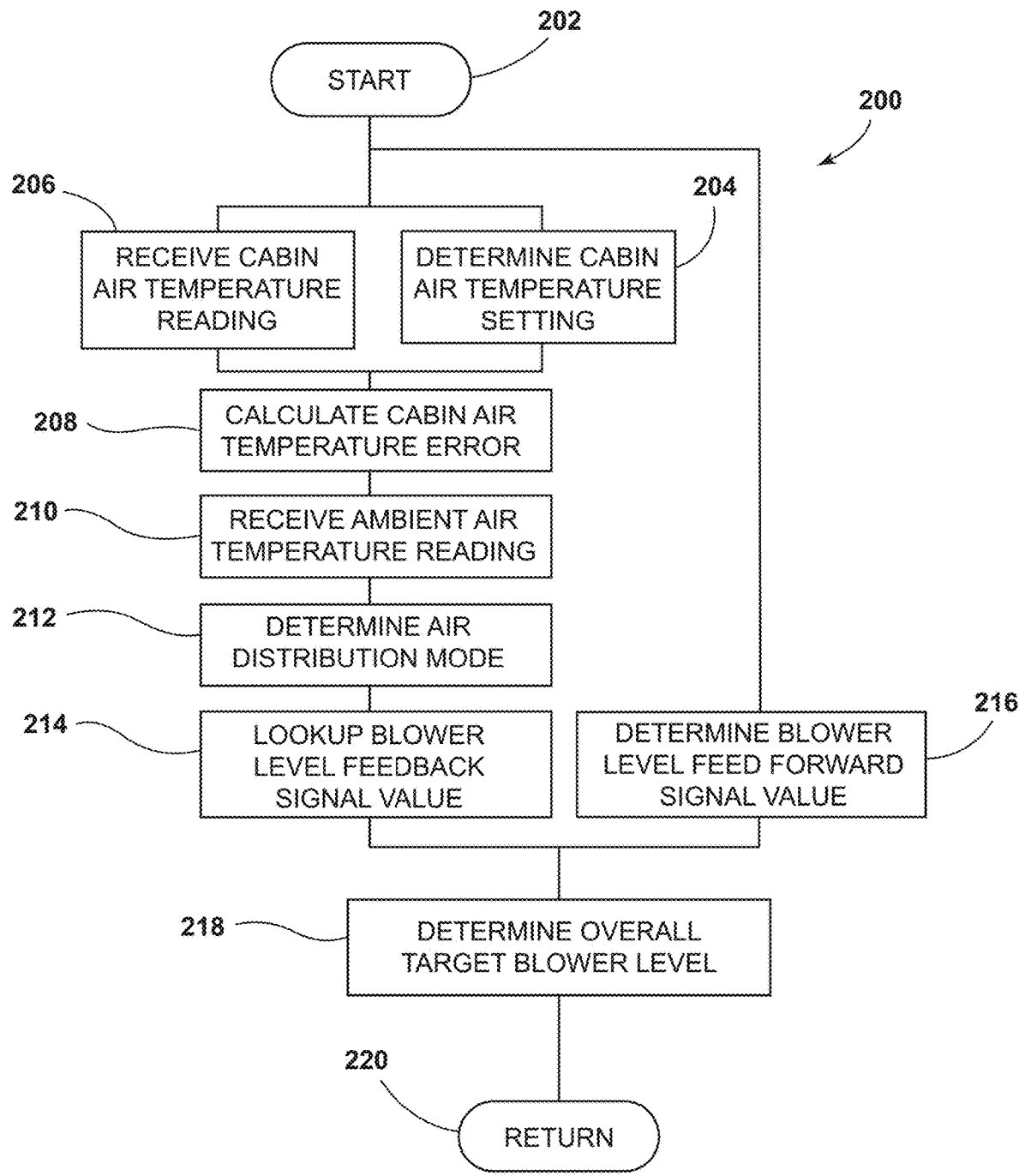
FIG. 3B is a flow diagram illustrating a method for determining a blower level feedback signal.

Referring now to FIGS. 3A and 3B, methods 100 and 200 are provided which include determining a discharge air temperature feedback signal and determining a blower feedback signal respectively. It will be understood by a skilled artisan that the provided methods and feedback signals are exemplary only and that various feedback signals may be determined by the HVAC controller 24 without departing from the scope of the present invention.

Referring now to FIG. 3A, the method 100 for determining an overall target discharge temperature is provided. The method 100 starts at operation 102. At operation 104 the HVAC controller 24 receives a cabin air temperature setting from a user control input. Generally, the cabin air temperature setting relates to a selected temperature at which the user desires the cabin to be maintained (e.g., 24 degrees Celsius). At operation 106, the HVAC controller 24 receives a cabin air temperature reading from the cabin air temperature sensor. Generally, the cabin air temperature sensor comprises a negative temperature coefficient (NTC) sensor located proximally to the cabin interior for determining the temperature of the cabin. The cabin air temperature sensor may include a motor to draw air from the cabin over the sensor. In some embodiments, the cabin air temperature sensor includes an air hose coupled to a venturi. The venture is coupled to a wall of the HVAC case or an HVAC duct. As air from the HVAC case or HVAC duct flows through the venturi, it creates a low-pressure zone to draw air through the air hose and past the cabin air temperature sensor. Accordingly, the cabin air temperature sensor is configured to provide a cabin air temperature reading to the HVAC controller 24.

At operation 108, a cabin air temperature error is calculated based on the cabin air temperature reading and the cabin air temperature setting. Generally, the cabin air temperature error is calculated by subtracting the cabin air temperature reading from the cabin air temperature setting. At operation 110, the HVAC controller 24 receives an ambient temperature reading from the ambient air temperature sensor. Generally, the ambient air temperature sensor is located on an exterior of the vehicle 10 (e.g., in a near a grill of the vehicle 10, or near a side view mirror of the vehicle 10). In some embodiments, the ambient air temperature reading is corrected to account for fluctuations in the readings provided by the sensor. For example, the ambient air temperature readings may be averaged over a desired amount of time to decrease temperature fluctuations. In some examples, the ambient air temperature readings may be corrected based on a speed of the vehicle 10 as reduced airflow past the ambient air temperature sensor may result in a false reading due to heat generated by other components (e.g., the engine, the condenser, and/or the radiator) of the vehicle 10.

At operation 112, the HVAC controller 24 determines the air distribution mode of the HVAC system. The air distribution mode may be entered manually by a user or it may be determined via an automatic temperature control (ATC) setting of the HVAC controller 24. The air distribution mode determines a set of ducts through which air is directed within the HVAC system. For example, in defrost mode, air may be directed out of ducts positioned near a windshield of the vehicle 10; in panel mode, air may be directed out of ducts directed toward a user's torso/upper body; and in floor mode, the air may be directed toward a user's feet/lower body. Combinations of these modes and other modes may be utilized without departing from the scope of the present disclosure.

The HVAC controller 24 looks up a value for a discharge air feedback signal at operation 114. Typically, the discharge air feedback signal is looked up based on the cabin air temperature error, the ambient air temperature reading, and the air distribution mode. In some embodiments, the HVAC controller 24 stores at least one lookup table related to the discharge air feedback signal. In some embodiments, the HVAC controller 24 stores a plurality of lookup tables related to the discharge air feedback signal with each table relating to at least one corresponding air distribution mode. Accordingly, in some embodiments, the HVAC controller 24 utilizes a specific lookup table corresponding to the current air distribution mode. The discharge air feedback signal value is then looked up based on the cabin air temperature error and the ambient air temperature reading.

Method 100 also includes the determination of a discharge air feed forward signal. At operation 116, the HVAC controller 24 receives a sun load intensity reading from the sun load sensor. The sun load sensor is typically disposed on a dashboard of the vehicle 10 proximate the windshield and is configured to indicate an intensity of sunlight entering the vehicle 10. Typically, the sun load sensor comprises a photodiode, but any suitable sensor is contemplated. In some embodiments, the sun load sensor may provide a driver-side reading and a passenger-side reading. At operation 118, the HVAC controller 24 determines a discharge air feed forward signal value based on at least one of the received ambient air temperature reading (operation 110), the received sun load sensor reading (operation 116), and the received cabin temperature setting (operation 104).

The air discharge feed forward signal and the air discharge feedback signal are combined at operation 120 to determine an overall target discharge air temperature. Generally speaking, the discharge air feed forward signal comprises an initial target discharge air temperature which is then modified by the discharge air feedback signal to account for environmental factors on the HVAC system such that the HVAC system may more accurately control the cabin 26 to the desired cabin air temperature setting. The HVAC controller 24 may then receive a reading from a discharge air temperature sensor and make adjustments to the HVAC system (e.g., increase/decrease compressor speed and/or adjust blend door positioning) until the reading from the discharge air temperature sensor reflects the overall target air discharge temperature. In some embodiments, the HVAC controller 24 repeats method 100 at operation 122 to monitor the condition of the cabin 26 and make adjustments to the HVAC system as needed.

Referring now to FIG. 3B, the method 200 for determining an overall target blower level is provided. The method 200 starts at operation 202. At operation 204, the HVAC controller 24 receives a cabin air temperature setting from a user control. Generally, the cabin air temperature setting relates to a temperature at which the user desires the cabin to be maintained (e.g., 24 degrees Celsius). At operation 206, the HVAC controller 24 receives a cabin air temperature reading from the cabin air temperature sensor. Generally, the cabin air temperature sensor comprises a negative temperature coefficient (NTC) sensor located proximally to the cabin interior for determining the temperature of the cabin. The cabin air temperature sensor may include a motor to draw air from the cabin over the sensor. In some embodiments, the cabin air temperature sensor includes an air hose coupled to a venturi. The venturi is coupled to a wall of the HVAC case or an HVAC duct. As air from the HVAC case or HVAC duct flows through the venturi, it creates a low-pressure zone to draw air through the air hose and past the cabin air temperature sensor. Accordingly, the cabin air temperature sensor is configured to provide a cabin air temperature reading to the HVAC controller 24.

At operation 208, a cabin air temperature error is calculated based on the cabin air temperature reading and the cabin air temperature setting. Generally, the cabin air temperature error is calculated by subtracting the cabin air temperature reading from the cabin air temperature setting. At operation 210, the HVAC controller 24 receives an ambient temperature reading from the ambient air temperature sensor. Generally, the ambient air temperature sensor is located on an exterior of the vehicle 10 (e.g., in a near a grill of the vehicle 10 or proximal to a side view mirror of the vehicle 10). In some embodiments, the ambient air temperature reading is corrected to account for fluctuations in the readings provided by the sensor. For example, the ambient air temperature readings may be averaged over a desired amount of time to decrease temperature fluctuations. In some examples, the ambient air temperature readings may be corrected based the speed of the vehicle 10 as reduced airflow past the ambient air temperature sensor may result in a false reading due to heat generated by other components (e.g., the engine, the condenser, and/or the radiator) of the vehicle 10.

At operation 212, the HVAC controller 24 determines the air distribution mode of the HVAC system. The air distribution mode may be entered manually by a user or it may be determined via an automatic temperature control (ATC) setting of the HVAC controller 24. The air distribution mode determines a set of ducts 22 through which air is directed within the HVAC system. For example, in defrost mode, air may be directed out of ducts positioned near a windshield of the vehicle 10; in panel mode, air may be directed out of ducts directed toward a user's torso/upper body; and in floor mode, the air may be directed toward a user's feet/lower body. Combinations of these modes and other modes may be utilized without departing from the scope of the present disclosure.

The HVAC controller 24 looks up a value for a blower level feedback signal at operation 214. Typically, the blower level feedback signal is looked up based on the cabin air temperature error, the ambient air temperature reading, and the air distribution mode. In some embodiments, the HVAC controller 24 stores at least one lookup table related to the blower level feedback signal. In some embodiments, the HVAC controller 24 stores a plurality of lookup tables related to the blower level feedback signal with each table relating to at least one corresponding air distribution mode. Accordingly, in some embodiments, the HVAC controller 24 utilizes a specific lookup table corresponding to the current air distribution mode. The blower level feedback signal value is then looked up based on the cabin air temperature error and the ambient air temperature reading.

Method 200 also includes the determination of a blower level feed forward signal. At operation 216, the HVAC controller 24 determines the blower level feed forward signal as received from a user input device operably connected to the HVAC controller 24 or as determined by the HVAC controller 24 while operating in the ATC mode.

The blower level feed forward signal and the blower level feedback signal are combined at operation 218 to determine an overall target blower level. Generally speaking, the blower level feed forward signal comprises an initial target blower level which is then modified by the blower level feedback signal to account for environmental factors on the HVAC system such that the HVAC system may more accurately control the cabin 26 to the desired cabin air temperature setting. In some embodiments, the HVAC controller 24 repeats method 200 at operation 122 to monitor the condition of the cabin 26 and make adjustments to the HVAC system as needed.

Figure 4A:
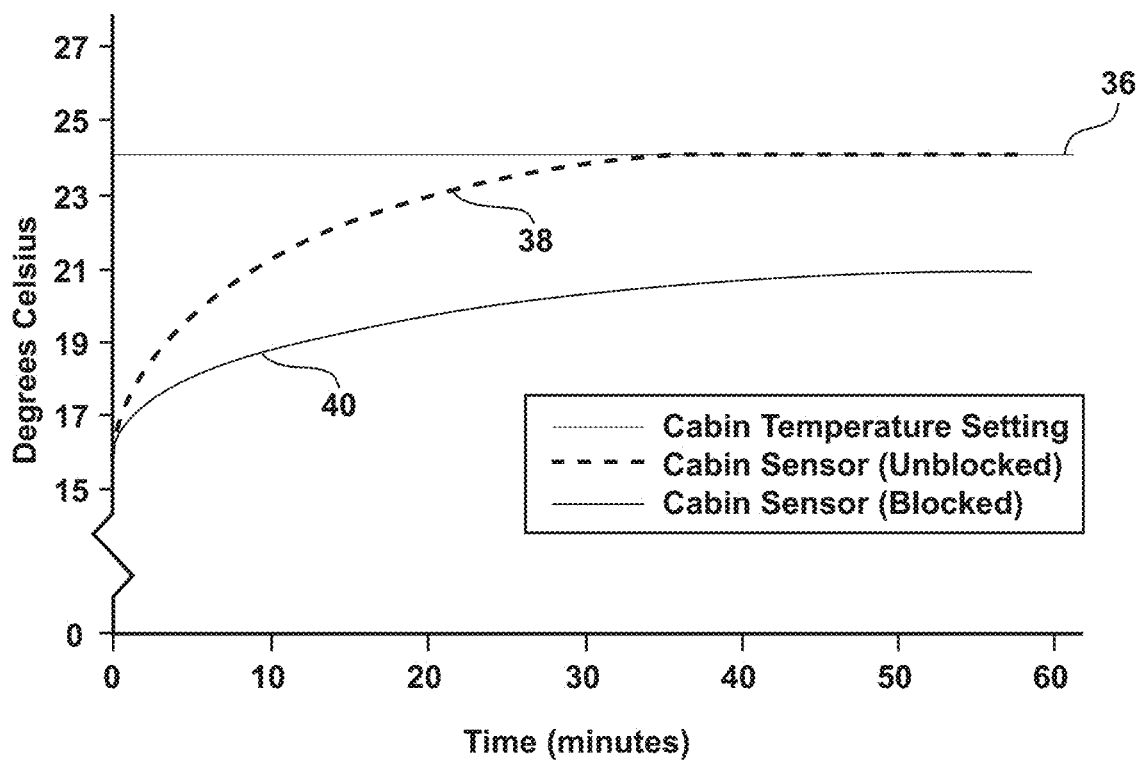
FIG. 4A is a graph of an exemplary cabin air temperature over time during warmup conditions.
Figure 4B:
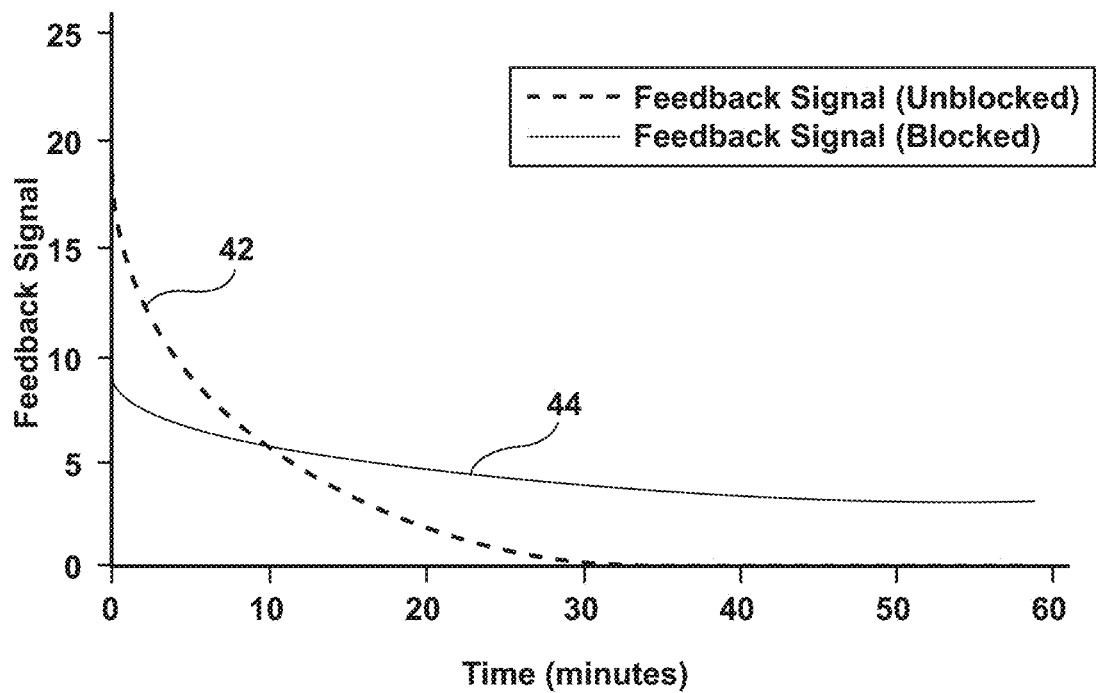
FIG. 4B is a graph of an exemplary feedback signal over time during warmup conditions.

Referring now to FIGS. 4A and 4B, exemplary data for the vehicle 10 during warmup conditions is provided. In FIG. 4A, an exemplary cabin air temperature setting 36, an exemplary data set for a cabin air temperature reading for the vehicle 10 having an unblocked cabin air filter 16 represented as unblocked cabin temperature 38, and an exemplary data set for the vehicle 10 having a blocked cabin air filter 16 represented as blocked cabin temperature 40. As shown, the unblocked cabin temperature 38 and the blocked cabin temperature 40 begins the warmup at a similar temperature (e.g., 16 degrees Celsius). As the HVAC system provides heated air to the cabin 26 of the vehicle 10, the cabin temperature rises closer to the cabin air temperature setting 36. However, the blocked cabin temperature 40 increases at a lower rate than the unblocked cabin temperature 38 due to the decreased airflow through the cabin air filter 16. Accordingly, the time needed until the unblocked cabin temperature 38 reaches the cabin air temperature setting 36 is much less than the time needed for the blocked cabin temperature 40 to reach the cabin air temperature setting. As shown in the example, depending on the degree of blockage of the cabin air filter 16, the blocked cabin temperature 40 may not reach the cabin air temperature setting 36 in some situations. Accordingly, a larger cabin air temperature error exists between the cabin air temperature setting 36 and the blocked cabin temperature 40 than between the cabin air temperature setting 36 and the unblocked cabin temperature 38.

In FIG. 4B, an exemplary feedback signal corresponding to the unblocked cabin temperature 38 of FIG. 4A is provided as unblocked feedback signal 42, and an exemplary feedback signal corresponding to the blocked cabin temperature 40 of FIG. 4A is provided as the blocked feedback signal 44. As shown, the unblocked feedback signal 42 decreases as the cabin air temperature error between the cabin air temperature setting 36 and the unblocked cabin temperature 38 decreases until the value of the unblocked feedback signal 42 nears or reaches zero. In contrast, the blocked feedback signal 44 decreases initially as the cabin air temperature error between the cabin air temperature setting 36 and the blocked cabin temperature 40 decreases, however, the unblocked feedback signal 42 remains above zero. In some embodiments, this is a result of the blocked cabin temperature 40 failing to reach the cabin air temperature setting 36. Accordingly, the blocked feedback signal 44 provides an indication of the degree of blockage of the cabin air filter 16.

Figure 5:
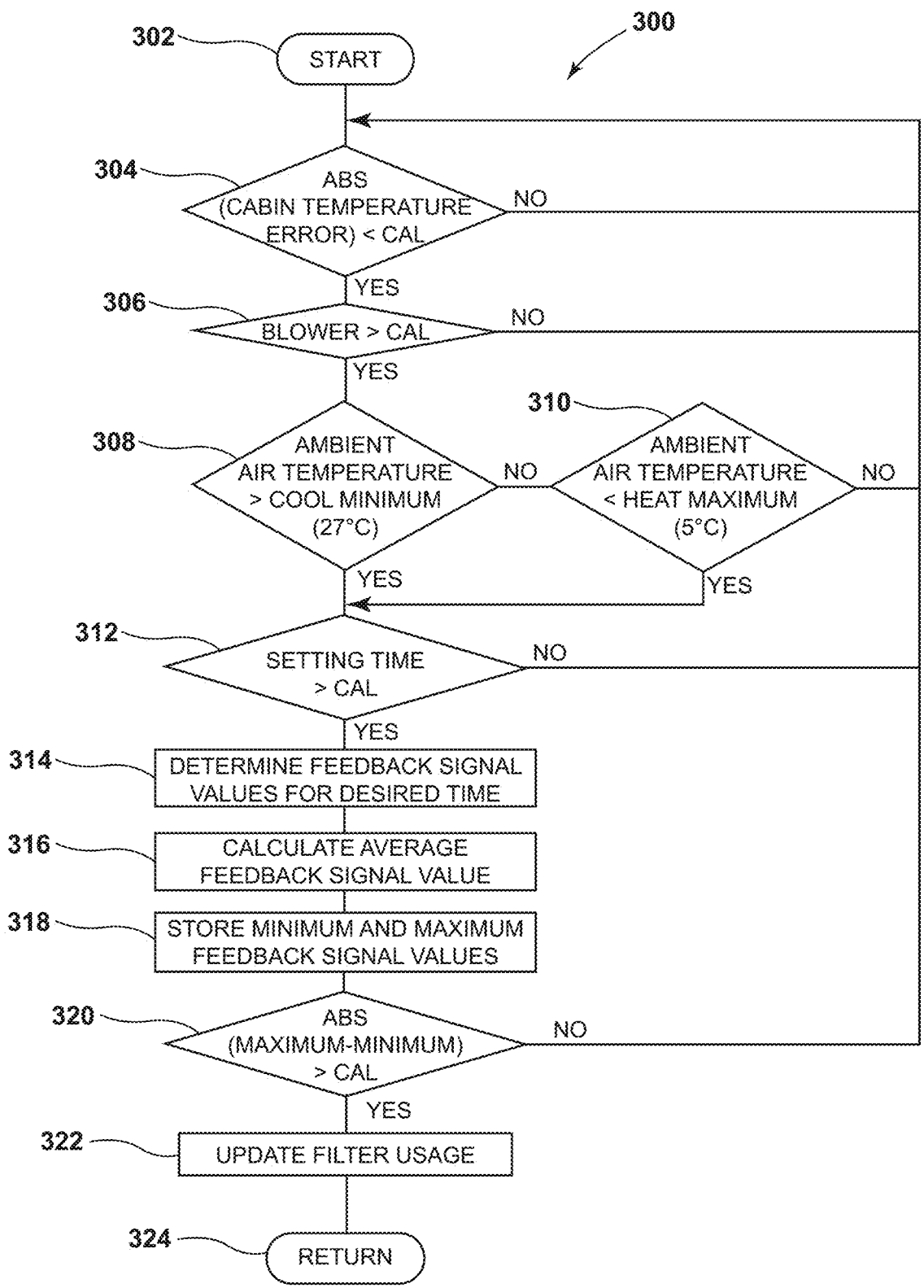
FIG. 5 is a flow diagram illustrating a method for utilizing the feedback signal to determine blockage of the cabin air filter.

Referring now to FIG. 5, in some embodiments, it may be desirable to utilize one or more conditions prior to detecting blockage of the cabin air filter 16 using the feedback signal. Accordingly, method 300 is provided including exemplary conditions that may be met prior to determining blockage of the cabin air filter 16. The method 300 may be initialized by the HVAC controller 24 at operation 302.

In some embodiments, the feedback signal may be most reliable for predicting blockage of the cabin air filter 16 during steady state operation of the HVAC system (e.g., from about 35 minutes to about 60 minutes of FIGS. 4A and 4B). Accordingly, at operation 304 the HVAC controller 24 may determine if the cabin air temperature error is above a calibrated cabin air temperature error value. If the cabin air temperature exceeds the calibrated cabin air temperature error value, then the HVAC controller 24 may continue to monitor the cabin air temperature error until the value is below the calibrated cabin air temperature error value.

Typically, as the cabin air filter 16 increases in blockage, the airflow may be restricted more at higher airflow rates than at lower airflow rates. The increased restriction in airflow results in a larger impact on the HVAC system and subsequently allows the feedback signal to be utilized to detect blockage of the cabin air filter 16 more accurately. Accordingly, in some embodiments, at operation 306, the HVAC controller 24 determines if the blower level exceeds a calibrated blower level value. When the blower level exceeds the calibrated blower level value, then higher airflow rates through the HVAC system may be indicated, and the feedback signal may be utilized to determine blockage of the cabin air filter 16. However, if the blower level does not exceed the calibrated blower level value, then the HVAC controller 24 may continue to monitor the blower level until the condition is met.

In various embodiments, the feedback signal is a function of the cabin air temperature error. Accordingly, the feedback signal may provide a more accurate representation of blockage of the cabin air filter 16 in conditions where the ambient air temperature exceeds a calibrated difference in value between the ambient air temperature and the cabin air temperature setting 36 and/or an expected cabin air temperature setting range. At operation 308, the HVAC controller 24 determines if the ambient air temperature exceeds a cooling-mode calibrated ambient air temperature value (e.g., 27 degrees Celsius). If the ambient temperature exceeds the cooling-mode calibrated ambient air temperature value, the HVAC controller 24 may determine that the condition has been met. If the ambient air temperature does not exceed the cooling-mode calibrated ambient air temperature value, the HVAC controller 24 may determine if the ambient air temperature is below a heating-mode calibrated ambient air temperature value (operation 310). At operation 310, the HVAC controller 24 determines if the ambient air temperature is below a heating-mode calibrated ambient air temperature value (e.g., 5 degrees Celsius). If the ambient temperature is below the heating-mode calibrated ambient air temperature value, the HVAC controller 24 may determine that the condition has been met. If the ambient air temperature is not below the heating-mode calibrated ambient air temperature value, the HVAC controller 24 may continue to monitor the ambient air temperature until the condition has been met.

In some embodiments, method 300 incorporates a settling time condition (operation 312) to help determine if the HVAC system has reached a steady state condition. At operation 312, the HVAC controller 24 may initiate a timer at the start (operation 302) of the method 300 to measure a settling time for the HVAC system. At operation 312, the HVAC controller 24 may determine if the settling time exceeds a calibrated settling time value. For example, the settling time may be about 30 minutes from the start of the engine of the vehicle 10 (see FIGS. 4A and 4B). If the settling time exceeds the calibrated settling time value, the HVAC controller 24 may determine that the condition has been met. If the settling time does not exceed the calibrated settling time value, the HVAC controller 24 may continue to monitor the settling time until the condition has been met.

The HVAC controller 24 may utilize the feedback signal to determine the level of blockage of the cabin air filter 16. In some embodiments, at operation 314, the HVAC controller 24 determines feedback signal values over a desired length of time (e.g., 5 minutes). At operation 316, the HVAC controller 24 may then average the feedback signal values determined during the desired length of time. In some embodiments, at operation 318, the HVAC controller 24 stores a maximum feedback signal value for the desired length of time and a minimum feedback signal value for the desired length of time. In some embodiments, at operation 320, the HVAC controller 24 may then determine if an absolute value of the difference between the maximum feedback signal value and the minimum feedback signal value is less than a calibrated absolute value of the difference between the maximum feedback signal value and the minimum feedback signal value. If the difference between the maximum feedback signal value and the minimum feedback signal value is less than a calibrated absolute value of the difference between the maximum feedback signal value and the minimum feedback signal value, it may indicate a steady state operation of the HVAC system and the condition has been met. If the difference between the maximum feedback signal value and the minimum feedback signal value is less than a calibrated absolute value of the difference between the maximum feedback signal value and the minimum feedback signal value, the HVAC controller 24 may continue to monitor the feedback signal values until the condition has been met.

At operation 322, the HVAC controller 24 uses the feedback signal value and/or the averaged feedback signal value to detect the level of blockage of the cabin air filter 16. Based on the feedback signal value, the HVAC controller 24 determines an expected level of blockage of the cabin air filter 16. The expected level of blockage of the cabin air filter 16 may then be used to determine a usage modifier. In some embodiments, the usage modifier is combined with the distance-based usage estimation 30 to determine an overall usage estimation of the cabin air filter 16.

In some embodiments, the method 300 is repeated at operation 324 to monitor the condition of the cabin air filter 16. In some embodiments, the HVAC controller 24 initiates the method 300 at predetermined intervals. In some embodiments, the method 300 is initiated at predetermined driven mileages of the vehicle 10. For example, the HVAC controller 24 may initiate the method 300 at predetermined driven mileages (e.g., 2500, miles, 7500 miles, 12500 miles, and 17500 miles) since the last replacement of the cabin air filter 16.

Figure 6A:
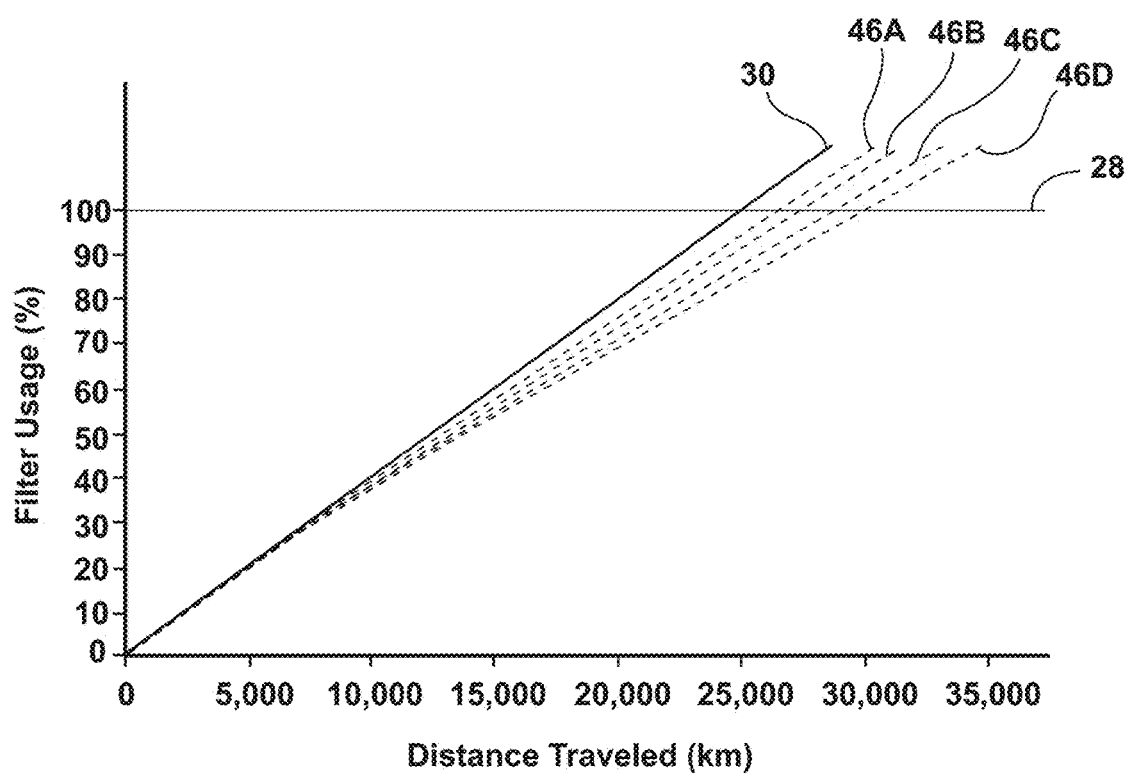
FIG. 6A is a graph of a cabin air filter usage estimation rate modification.
Figure 6B:
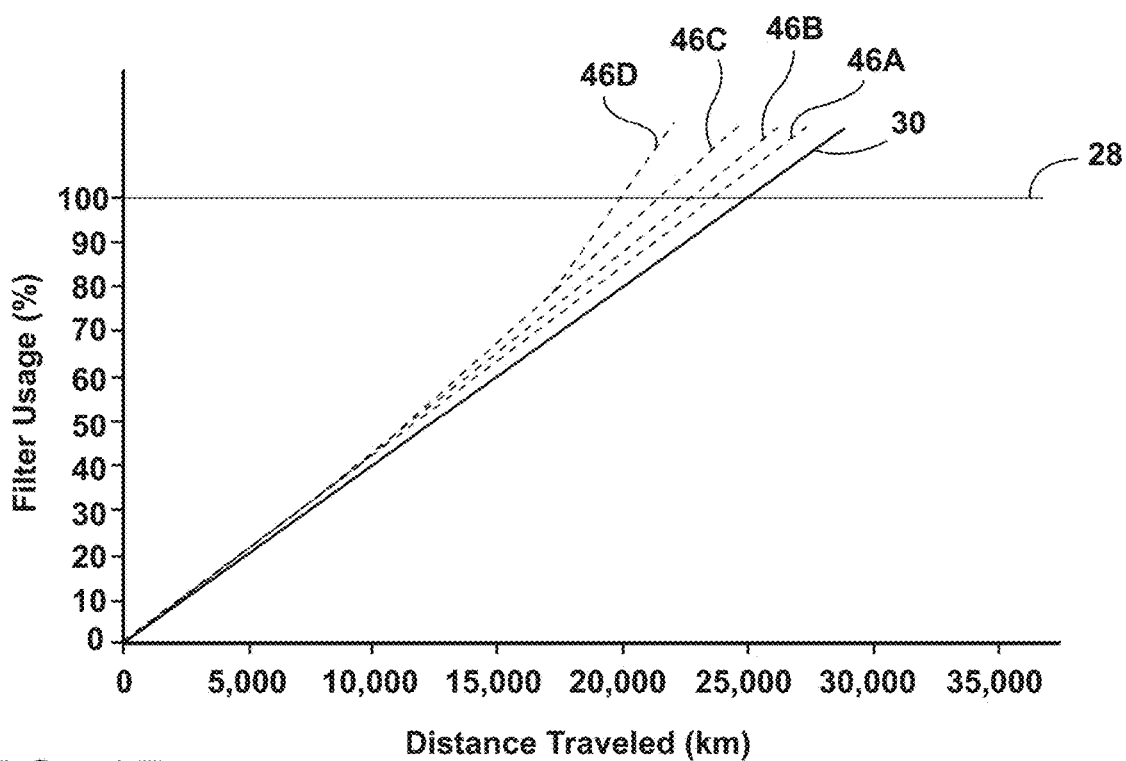
FIG. 6B is a graph of a cabin air filter usage estimation rate modification.

Referring now to FIGS. 6A and 6B, the usage modifier may be combined with the distance-based usage estimation 30 to modify an estimated usage rate of the distance-based usage estimation 30. In some embodiments, the usage modifier and the distance-based usage estimation 30 are combined to an adjusted usage estimation 46A-46D of the cabin air filter 16. As shown in FIG. 6A, the adjusted usage estimation 46A-46D may indicate a longer than expected life of the cabin air filter 16 than based on the distance-based usage estimation 30 alone. As shown in FIG. 6B, the adjusted usage estimation 46A-46D may indicate a shorter than expected life of the cabin air filter 16 than based on the distance-based usage estimation 30 alone. In some embodiments, the usage estimation may be updated at predetermined intervals or driven mileages. As shown, the HVAC controller 24 may provide an adjusted usage estimation 46A-46D at 2500 miles, 7500 miles, 12500 miles, and 17500 since the last replacement of the cabin air filter 16. It will be understood to a skilled artisan that the disclosed intervals are exemplary and that actual intervals may differ without departing from the scope of the present disclosure. In some embodiments, the intervals are time-based. Based on the adjusted usage estimation 46A-46D, the HVAC controller 24 may determine an expected driven mileage at which the cabin air filter 16 will reach the filter replacement level 28.

Figure 7:
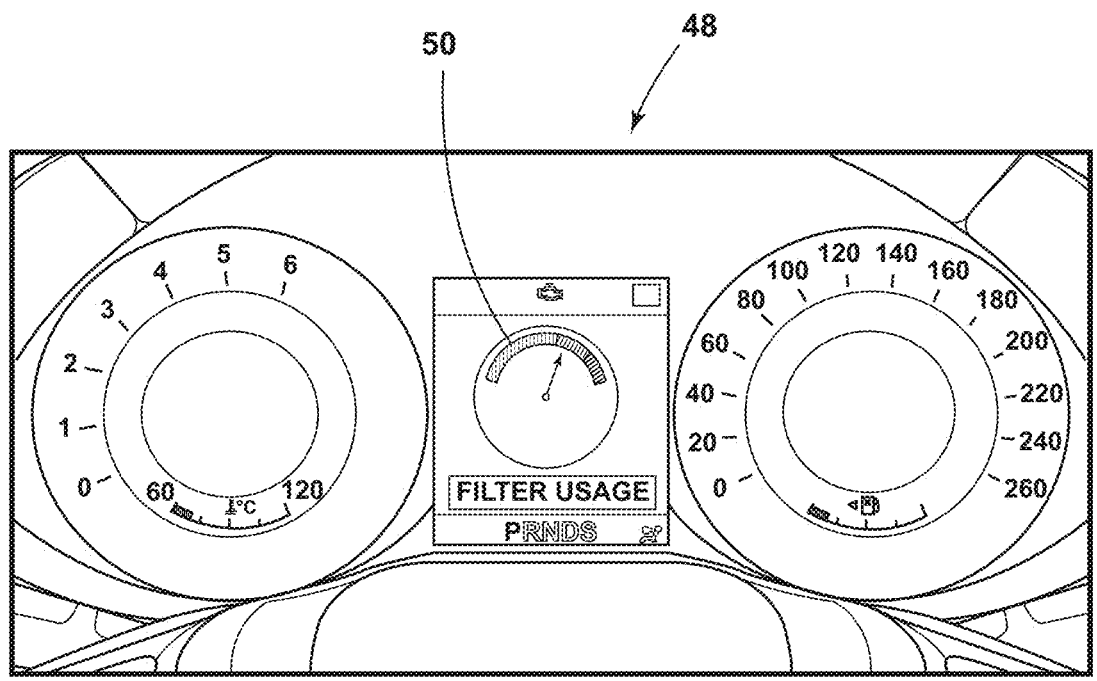
FIG. 7 is an elevational view of an instrument panel having a cabin air filter usage indicator.

Referring now to FIG. 7, the HVAC controller 24 may be configured to provide a filter usage indicator 50 to the user of the vehicle 10. In the shown embodiment, the filter usage indicator 50 is displayed on the instrument panel 48. However, it is contemplated that the filter usage indicator 50 may be displayed on any part of the vehicle 10 including, but not limited to, the HVAC controller 24, a heads up display, and a console area. In some embodiments, the vehicle 10 may be configured to display the filter usage indicator 50 on a user device (e.g., a portable electronic device). In some embodiments, the HVAC controller 24 is configured to provide an alert corresponding to a usage level of the cabin air filter to the user if the filter replacement level 28 has been reached or exceeded.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle heating, ventilation, and air conditioning (HVAC) system comprising:
   a cabin air filter;
   an ambient air temperature sensor;
   a cabin air temperature sensor; and
   a controller operably coupled to the ambient air temperature sensor and the cabin air temperature sensor, wherein the controller is configured to provide a feedback signal based on the ambient air temperature, the cabin air temperature, a cabin air temperature setting, and an air distribution mode of the HVAC system, and wherein the controller is configured to detect an air filter blockage level from the feedback signal, and wherein the air filter blockage level at least partially determines an estimated usage of the cabin air filter, wherein the controller is configured to combine the air filter blockage level with a distance-based usage estimation to determine an overall usage estimation of the cabin air filter.

2. The HVAC system of claim 1, wherein the feedback signal is combined with a feed forward signal to determine at least one of a target discharge air temperature and a target blower level.

3. A vehicle heating, ventilation, and air conditioning (HVAC) system comprising:
   a cabin air filter;
   an ambient air temperature sensor;
   a cabin air temperature sensor; and
   a controller operably coupled to the ambient air temperature sensor and the cabin air temperature sensor, wherein the controller is configured to provide feedback signal based on the ambient air temperature, the cabin air temperature, a cabin air temperature setting and an air distribution mode of the HVAC system, and wherein the controller is configured to detect an air filter blockage level from the feedback signal, and wherein the air filter blockage level at least partially determines an estimated usage of the cabin air filter, wherein the controller is configured to modify an estimated usage rate of the cabin air filter based on the air filter blockage level.

4. The HVAC system of claim 1, wherein the controller is configured to provide an alert corresponding to an estimated usage of the cabin air filter to a user of the HVAC system.

5. The HVAC system of claim 1, wherein the controller is configured to determine a blower value, and wherein the controller determines if the blower value exceeds a calibrated blower value level, and wherein the controller detects the air filter blockage level from the feedback signal when the blower value has a higher airflow rate than the calibrated blower value level.

* * * * *